(12) United States Patent
Poberezhskiy et al.

(10) Patent No.: US 6,735,013 B2
(45) Date of Patent: May 11, 2004

(54) SYSTEM AND METHOD FOR WAVELENGTH CONVERSION USING TRAVELING-WAVE POLYMERS FOR WDM APPLICATIONS

(75) Inventors: Ilya Y. Poberezhskiy, Los Angeles, CA (US); Harold R. Fetterman, Santa Monica, CA (US); Joseph Michael, Los Angeles, CA (US)

(73) Assignee: Pacific Wave Industries, Inc., El Segundo, CA (US)

( * ) Notice: Subject to any disclaimer, the term of this patent is extended or adjusted under 35 U.S.C. 154(b) by 264 days.

(21) Appl. No.: 10/008,926

(22) Filed: Dec. 5, 2001

(65) Prior Publication Data

US 2003/0107799 A1 Jun. 12, 2003

(51) Int. Cl.[7] ............................. G02F 1/365; G02F 2/02
(52) U.S. Cl. ............................. 359/332; 359/326; 385/2
(58) Field of Search ................................ 359/326–332; 385/1–3

(56) References Cited

U.S. PATENT DOCUMENTS 6,643,419 B2 * 11/2003 Chang et al. .................. 385/14
2003/0103709 A1 * 6/2003 Grinberg et al. ............... 385/2

OTHER PUBLICATIONS

A.H. Udupa et al, "High–Frequency, Low–Crosstalk Modulator Arrays Based On FTC Polymer Systems", Electronics Letters, vol. 35, No. 20, Sep. 30, 1999, pp. 1702–1704.*
R. Ramaswami and K. N. Sivarajan, Optical Networks: a Practical Perspective, Academic Press, 1998, pp. 160–167, 172–174.
B. M. Bolotovskii and S. N. Stolyarov, "Reflection of Light from a Moving Mirror and Related Problems," Soviet Phys. Uspekhi, 32, 813–827 (1989)(Sep.).
R. L. Savage, Jr., R. P. Brogle, W. B. Mori, C. Joshi, "Frequency Upshifting and Pulse Compression via Underdense Relativistic Ionization Fronts," IEEE Trans. Plasma Sci., 21, 5–19 (Feb. 1993).
H. Zhang, M.–C. Oh, A. Szep, W. H. Steier, C. Zhang, L. R. Dalton, H. Erlig, Y. Chang, D. H. Chang, H. R. Fetterman, "Push–Pull Electro–Optic Polymer Modulators with Low Half–Wave Voltage and Low Loss at both 1310 and 1550 nm," Appl. Phys. Lett., 78, 3136–8 (May 2001).

* cited by examiner

Primary Examiner—John D. Lee
(74) Attorney, Agent, or Firm—Benman, Brown & Williams

(57) ABSTRACT

A frequency shifting device. The present invention provides a device and method for shifting a frequency of an optical signal comprising the steps of providing a layer of optically refractive material having a moving refractive boundary responsive to an application of an electrical signal. The inventive device includes a layer of optically refractive material having a refractive boundary responsive to an application of an electrical signal and an arrangement for providing an electrical signal to the layer to effect a predetermined frequency shift of an optical signal passing therethrough. In an illustrative embodiment, the device includes an active polymer layer, an optically conductive first cladding disposed beneath the active polymer layer, and a second cladding layer disposed above the active polymer layer, a microstrip line disposed over the second cladding layer and a ground plane beneath the first cladding layer.

9 Claims, 2 Drawing Sheets

SYSTEM AND METHOD FOR WAVELENGTH CONVERSION USING TRAVELING-WAVE POLYMERS FOR WDM APPLICATIONS

BACKGROUND OF THE INVENTION

1. Field of the Invention

The present invention relates to optical communication systems. More specifically, the present invention relates to wavelength converters for wavelength division multiplexing (WDM) applications.

2. Description of the Related Art

High-speed, high-capacity communication is currently enabled by the widespread use of optical communications technology. Optical modulators encode light of a predetermined wavelength with data. The encoded signal is then combined with other optically encoded signals and is transmitted over a medium. Typically, the medium is an optical fiber. Switching and routing of the optically encoded signals is effected using wavelength division multiplexers (WDMs) and optical switches.

Several approaches to wavelength conversion in optical WDM systems are known in the art. The simplest and most mature is an opto-electronic approach. With this approach, modulation carried by light at one wavelength is detected by an optical receiver and used to modulate light from another source at a different wavelength. That is, the first optical signal is converted to an electrical signal and modulated. The modulated signal is then converted from an electrical to an optical signal. In general, the all-optical techniques use nonlinear interactions between a signal and a probe beam to impart the signal's modulation to light at a new wavelength. Thus, they require two optical inputs, the original signal being one of them.

An alternative approach involves the use of a saturable amplifier, such as a semiconductive device, as a gain medium. The gain medium is then modulated with an input optical signal. The modulated gain medium then is used to modulate a second beam having a second carrier wavelength relative to the input signal. Unfortunately, this approach also requires two lasers and a saturable amplifying gain medium. In addition the extinction ratio that can be achieved is quite small and it depends on the power of the input signal. Such wavelength converters can work only for amplitude-modulated signals. The change in the number of carriers in the SOA also leads to a change in refractive index and undesirable effects on the phase of the output. Therefore it is awkward and expensive. Another all-optical method uses four-wave mixing in an SOA of signal at frequency $f_s$ and probe at frequency $f_p$ producing modulated signal at frequency $2f_p-f_s$. Although this method is completely transparent to different bit rates and modulation formats, it has very low conversion efficiency, which rapidly decreases as the frequency separation increases.

Consequently, a need remains in the art for a more effective system or method for effecting wavelength conversion of an optical signal.

SUMMARY OF THE INVENTION

The need in the art is addressed by the frequency shifting device of the present invention. Generally, the inventive device includes a layer of optically refractive material having a moving refractive boundary responsive to an application of a traveling wave electrical signal and an arrangement for providing an electrical signal to the layer to effect a predetermined frequency shift of an optical signal passing therethrough.

In an illustrative embodiment, the device includes an active polymer layer, an optically conductive first cladding disposed above the active polymer layer, a microstrip line disposed over the first cladding layer, a second cladding layer disposed below the active polymer layer, and a ground plane disposed below the second cladding layer.

The present invention thereby provides a method for shifting a frequency of an optical signal comprising the steps of providing a layer of optically refractive material having a moving refractive boundary responsive to an application of an electrical signal and providing an electrical signal to the layer to effect a predetermined frequency shift of an optical signal passing therethrough.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
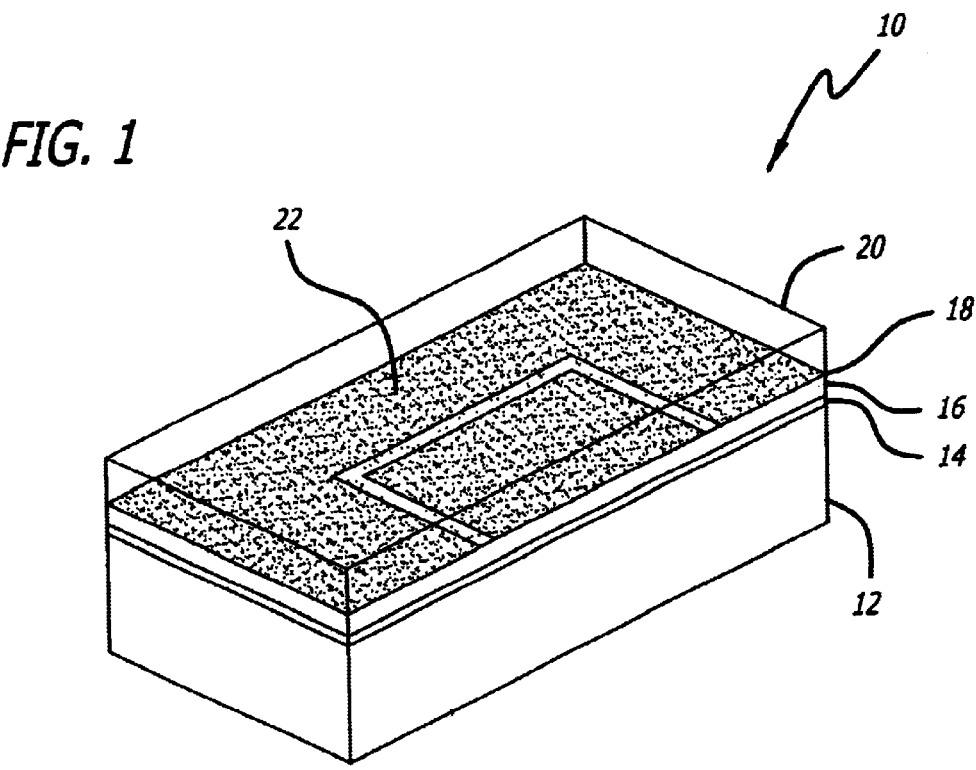
FIG. 1 is a perspective exploded view of an illustrative embodiment of a frequency shifting device implemented in accordance with the teachings of the present invention.

FIG. 1 is a perspective exploded view of an illustrative embodiment of a frequency shifting device implemented in accordance with the teachings of the present invention. The device 10 includes a substrate 12 over which a ground plane 14 is disposed. A lower cladding 16 is disposed over the ground plane 14. An active polymer layer 18 is disposed on the lower cladding 16. As is known in the art, an active polymer is a layer of optically conductive material having an index of refraction which changes in response to the application of electrical signal. An upper cladding 20 is then disposed over the active polymer layer 18. Note the provision of a microstrip line 22 above the upper cladding 20 The substrate 12 may be quartz or other suitable material. In the best mode, the ground plane 14 and the microstrip 22 are electrically conductive, e.g., gold. The upper lower cladding may be implemented with UV15 and the active polymer may be permit with CPW-x2. However, those of ordinary skill in the art will appreciate that the present the teachings are not limited to the materials utilized in the illustrative embodiment of FIG. 1.

In operation, the present invention utilizes wavelength shifting due to refraction of light through a moving boundary between two media with different indices of refraction. The interaction of electromagnetic waves with a moving boundary has been considered. Most of the relevant publications have focused on reflection of electromagnetic waves from moving boundaries rather than refraction through them. In addition, prior teachings generally have considered the boundary formed by either a relativistic electron beam or a plasma ionization front. In addition, the prior art typically focused on electromagnetic waves that were not in the optical domain.

The present invention teaches wavelength conversion of optical signals in traveling-wave electro-optic (EO) devices. The term 'frequency conversion' will be used herein instead of 'wavelength conversion' as it is believed to be more accurate inasmuch as technically the wavelength is "converted" when light crosses between two media with different refractive indices.

As is known in the art, traveling-wave electro-optical (EO) phase modulators may include a nonlinear waveguide, in which light is propagating, and a microstrip line in which a modulating microwave signal is traveling in the same direction. The amplitude of the microwave signal changes the refractive index in the optical waveguide, thus phase-modulating light in it. In order to increase the modulation bandwidth, it is often desirable to match the velocities of the microwave and optical signals. However, some mismatch always exists. Therefore, the microwave signal creates boundaries between regions with different indices of refraction, and the optical signal constantly crosses them. The boundary (i.e. microwave signal) can move faster or slower than the optical signal (superluminal and subluminal cases, respectively). An expression is provided below for frequency conversion for the superluminal case. The result for the subluminal case is the same.

Consider a plane light wave propagating in +z direction in a medium with a refractive index $n_0 + \Delta n_0$ that is being overtaken by a sharp boundary with another medium with refractive index $n_0$. The boundary is moving with velocity $v > c/(n_0 + \Delta n_0), c/n_0$ in the direction of light propagation. At t=0, both the boundary and crest 1 of the optical wave are at z=0. The time 't' it takes for the boundary to catch up with the next crest (crest 2) can be determined from the equation $t = [\lambda_1 + tc/(n_0 + \Delta n_0)]/v$. Thus, $t = \lambda_1[v - c/(n_0 + \Delta n_0)]$. The new wavelength of the refracted wave $\lambda 2$ is equal to the position of the boundary at t minus the position of crest 1 at t:

$$\lambda_2 = tv - tc/n_o = \lambda_1 \frac{(n_o + \Delta n_o)}{n_o} \frac{n_o v - c}{(n_o + \Delta n_o)v - c} \qquad (1)$$

Knowing this, the new frequency can be found:

$$f_2 = f_1 \frac{(n_o + \Delta n_o)v - c}{n_o v - c} \qquad (2)$$

The refractive index seen by the microwave signal is $n_m$, so the boundary moves with velocity $c/n_m$. Transforming expression (2):

$$f_2 = f_1 \left(1 + \frac{\Delta n_o}{n_o - n_m}\right) \qquad (3)$$

Thus, the velocity mismatch is desirable and, indeed, necessary for frequency conversion. If the boundary is not sharp (i.e. large compared to one wavelength), then it can be viewed as a collection of m (where m is a very large number) sharp boundaries with very small changes $\Delta n_0/m$ in the index of refraction. Applying relationship (2), we can express the output as:

$$f_2 = f_1 \prod_{k=1}^{m} \frac{(n_o + \Delta n_o[m+1-k]/m)v - c}{(n_o + \Delta n_o[m-k]/m)v - c} = f_1 \frac{(n_o + \Delta n_o)v - c}{n_o v - c} \qquad (4)$$

From equation (4) it is evident that only the initial and final values of the refractive index are needed to find the frequency shift. The shape of the boundary affects only the amplitudes of the reflected and transmitted signals. In particular, if the transition region is larger than the wavelength, the reflection coefficient will decrease significantly, and therefore more energy will go through the interface.

Next, let the optical input be a sequence of square pulses with duration T and period 2T. The modulating voltage is a square wave with period 2T and magnitude of either V or −V, which correspond to two values of the refractive index in the parts of the waveguide where this voltage is applied: $n_0 + \Delta n_0$ and $n_0$. The square wave starts to travel in the active region in phase with the optical pulse train. This is depicted in FIG. 2.

Figure 2:
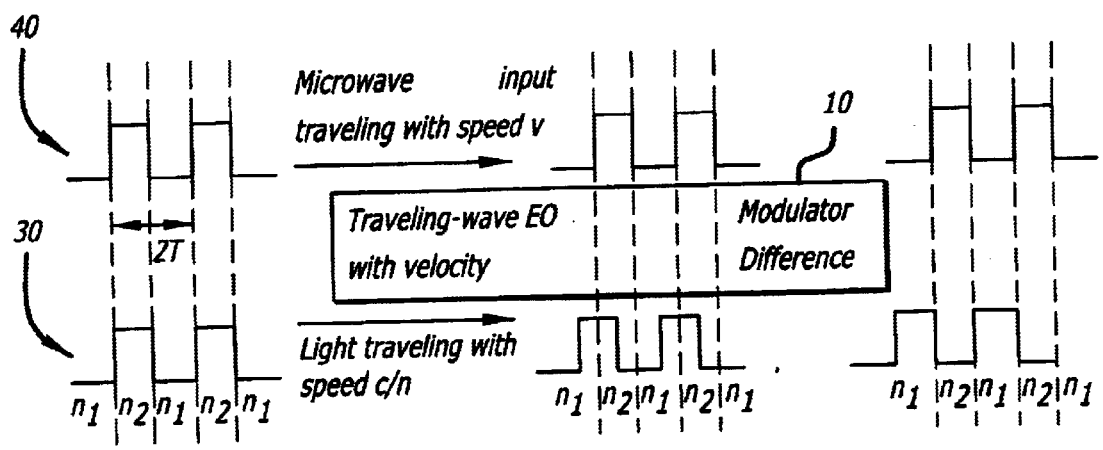
FIG. 2 is a diagram showing optical and microwave inputs traveling through an active region of a traveling wave electro-optical modulator such as that illustrated in FIG. 1.

FIG. 2 is a diagram showing optical and microwave inputs traveling through an active region of a traveling wave electro-optical modulator such as that illustrated in FIG. 1. In FIG. 2, the optical wave 30 and the microwave 40 move through the device 10 with a relative velocity difference. The optical wave 30 moves through the lower cladding of 16 while the microwave 40 moves through the microstrip line 22. Each optical pulse enters the device 10 in the active region thereof where $n_2 = n_0 + \Delta n_0$. Since it travels slower than the microwave signal, the optical pulse gradually crosses into the region $n_1$ with index $n_0$. The duration T is chosen so that at the end of the active region L, the optical pulse train is retarded by exactly T with respect to the modulating square wave, or, equivalently, all parts of the optical signal see the index $n_0$.

$$T = \frac{L(n_o - n_m)}{c} \qquad (5)$$

Thus, in the illustrative embodiment, all parts of the optical signal cross the moving boundary and change in carrier frequency. In such a frequency converter, the input and output frequencies can be variable, and the frequency shift is controlled by the amplitude of the modulating square wave. Both up and down conversion are possible.

Of course, a signal generator with finite bandwidth cannot create the ideal square wave with infinitely sharp edges. Therefore, the duty cycle of the input optical pulse train must be less than 50%.

The material most widely used in EO devices is $LiNbO_3$. However, the velocities of optical and electrical signals are strongly mismatched in it. It can be seen from equation the (3) that frequency shift is inversely proportional to the velocity mismatch, so it is very difficult to achieve significant frequency shifts (hundreds of GHz to few THz) using $LiNbO_3$ as an active material.

A new generation of polymer devices presents a viable alternative to $LiNbO_3$ in a variety of applications. That is, the velocity mismatch in polymer devices is much smaller than in $LiNbO_3$, with typical mismatch being about $n_0 - n_m \approx 0.1$, and propagation is superluminal. This mismatch can be tailored by changing the impedance of the microstrip line, and the desirable value of about 0.15 can be achieved. Microwave losses in the microstrip lines are quite high (about 0.74 dB cm$^{-1}$ GHz$^{-1/2}$), so the index difference across the boundary is much sharper in the beginning of the active region than at the end. This decreases the amount of frequency shift by up to 50%, but has no fundamental effect on the frequency conversion, since all parts of the optical signal still experience similar initial and final values of the refractive index.

Using $r_{33}$=36 pm/V at 1.55 $\mu$m [4] and $n_0-n_m$=0.15, if the amplitude of the applied voltage is 20 V, the corresponding frequency shift is about 300 GHz. Since the separation of 2 adjacent WDM channels is 100 GHz, a polymer phase modulator can be used as a frequency converter for wavelength division multiplexed (WDM) systems. If the length of the active region L is chosen to be 3 cm, the duration T of the signals sent into each arm can be found from expression (5) to be T=15 ps.

When the conversion of a pulse, instead of continuous wave, is analyzed, the pulse's finite bandwidth has to be taken into account. Each frequency is multiplied by a certain factor, and therefore the bandwidth is broadened by this factor. Clearly, the pulse duration shrinks by the same factor, and, because of energy conservation, the amplitude is multiplied by it. The scaling of the pulse bandwidth and duration by 0.1% that takes place for the considered values of frequency shift is inconsequential. In polymers, the optical refractive index changes by less than $2*10^{-5}$ over 100 GHz at 1.55 $\mu$m. Thus, the value of $n_0-n_m$ and, therefore, the frequency shift vary by a maximum of 0.01% among different frequencies in a WDM signal, so it is safe to neglect the effect of dispersion on the frequency conversion.

Figure 3:
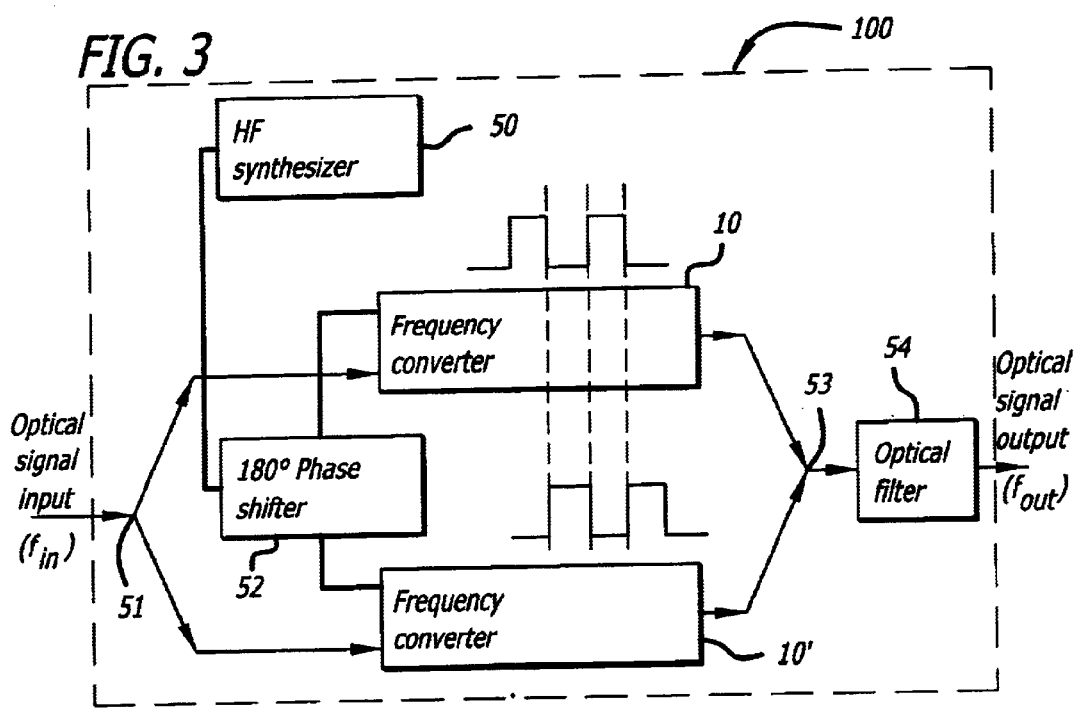
FIG. 3 is a block diagram of an illustrative implementation of a cw frequency converter utilizing a frequency shifting device implemented in accordance with the teachings of the present invention.

In order to perform the conversion of continuous wave (CW) optical signals, a device such as the one shown in FIG. 3 can be used.

FIG. 3 is a block diagram of an illustrative implementation of a frequency converter utilizing a frequency shifting device implemented in accordance with the teachings of the present invention. The converter 100 includes two frequency converters 10 and 10' implemented as discussed above and situated in the two arms of a Mach-Zehnder interferometer and driven by radio frequency (RF) square waves provided by a synthesizer 50 and delayed by T with respect to each other. As the result, complementary parts of the input CW signal are converted in each arm to the desirable new frequency. After the output Y-junction 53, an optical bandpass filter 54 rejects the components that did not undergo the desired frequency conversion. In this device the two converters are driven by RF square waves that are 180° out of phase, the complementary parts of the input CW signal are up and down shifted in each arm by frequency $f_1 \Delta n_0/(n_0-n_m)$. If a sinusoidal microwave signal is used instead of the square wave, then the incoming optical signal has to be split into k arms (k>≈5), each containing a frequency converter. In this case, the driving sinusoid in the m$^{th}$ arm has to be phase-shifted by 360°/k with respect to the (m-1)$^{st}$ arm.

Frequency Conversion as a Special Case of Phase Modulation. The present invention is based on a phase modulator, with its length and velocity mismatch connected to pulse duration through equation (5). Below frequency conversion is analyzed as a special case of phase modulation with velocity mismatch.

In a Pockels medium the optical index of refraction no depends on an applied electric field E as $n_0(E) \approx n_0 - rn_0^3 E/2$, where r is the Pockels coefficient of the medium. After propagating a distance L in a waveguide with a voltage V applied to it across an electrode spacing d, the beam undergoes a phase shift $\phi$ of:

$$\phi = n_o(E)k_0 L \approx \phi_0 - \pi \frac{rn_o^3 EL}{\lambda_0} = \phi_0 - \pi \frac{V}{V_\pi} \quad (6)$$

where $\phi_0 = 2\pi n_0 L/\lambda_0$ and $V_\pi = d\lambda_0/(Lrn_0^3)$ is the half-wave voltage that shifts the phase by $\pi$.

Thus, at the output of the device, the phase of the electric field can be written as:

$$E(t) \propto \exp\left[j\left(\phi_0 - \pi \frac{V(t)}{V_\pi} - \omega t\right)\right] \quad (7)$$

Now, taking into account the velocity mismatch between the optical and microwave signals, the difference in the time these signals take to cross the active region is T. The expression for the modulated electric field becomes:

$$E(t) \propto \exp\left[j\left(\phi_0 - \frac{\pi}{V_\pi T}\int_t^{t+T} V(\tau)d\tau - \omega t\right)\right] \quad (8)$$

After substituting equations (5) and (6) into equation (8), simplifying, and leaving only time-dependent terms, yields:

$$E(t) \propto \exp\left[-j\omega\left(t + \frac{1}{n_o - n_m}\frac{rn_o^3}{2d}\int_t^{t+T} V(\tau)d\tau\right)\right] \quad (9)$$

In the ideal case of frequency conversion described above, the modulating signal is a square wave that can be expressed as:

$$V(t) = \begin{cases} V, & 2kT < t < (2k+1)T \\ -V, & (2k-1)T < t < 2kT \end{cases} \quad (10)$$

where k is any integer. At the end of the modulator, the optical pulses occupy time slots for which (2k-1)T<t<2kT. For these slots it is clear that:

$$\int_t^{t+T} V(\tau)d\tau = V(2t - 4kT + T), \quad (2k-1)T < t < 2kT \quad (11)$$

Substituting equations (11) and (6) into equation (9) and leaving only time-dependent terms, a final expression is obtained for the time-varying part of the optical field:

$$E(t) \propto \exp\left[-j\omega t\left(1 + \frac{\Delta n_0}{n_0 - n_m}\right)\right] \quad (12)$$

The new frequency in equation (12), $\omega_2 = \omega_1(1 + \Delta n_0/(n_0 - n_m))$ is just a restatement of equation (3). Thus, it is evident that the velocity-mismatched phase modulation of pulsed light indeed produces carrier frequency conversion if the necessary conditions are satisfied.

Figure 4A:
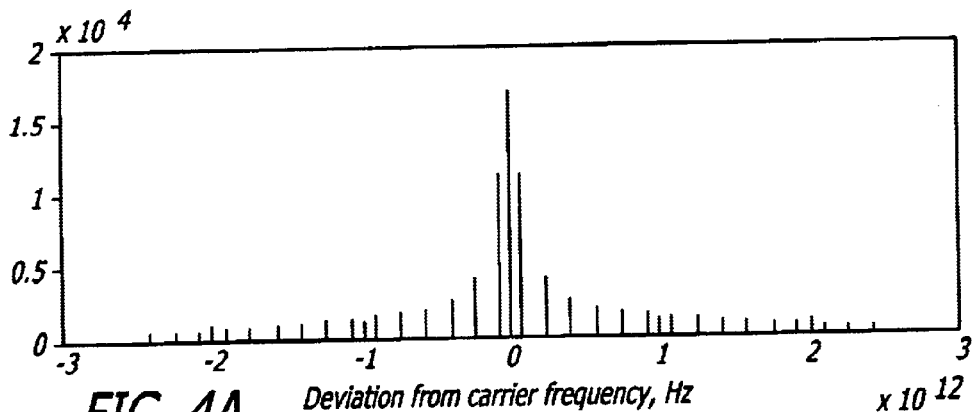
FIGS. 4a and 4b are diagrams showing the spectrum of an optical pulse train before and after frequency shifting in accordance with the present teachings, respectively.
Figure 4B:
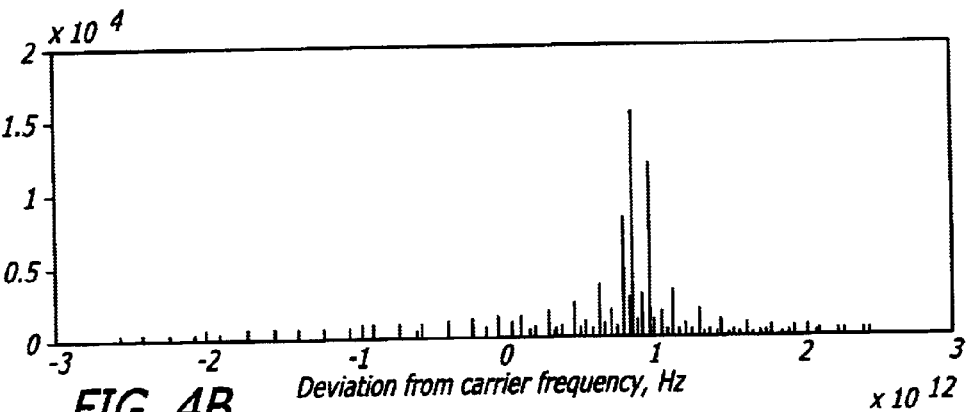

FIGS. 4a and 4b are diagrams showing the spectrum of an optical pulse train before and after frequency shifting in accordance with the present teachings, respectively. The scraps were generated in a Matlab environment for several different cases, using expression (9) as the basis for simulation. In the case of ideal frequency conversion analyzed above, where it is relatively easy to compare simulation results with theoretical predictions, the two are in substantially complete agreement. The intended shift of 880 GHz (about 7 nm at 1.55 µm) is illustrated. Since the signal is periodic, it is comprised of a train of delta functions with sync envelope shifts by 880 GHz. The shape of the envelope is due to the square shape of each pulse.

In short, the present teachings provide a method for wavelength conversion (frequency shifting) in WDM systems based on transmission through a moving boundary. Unlike competing all-optical methods, it requires only one optical input, so there is no need for additional lasers. The amount of the wavelength shift is controlled by the amplitude of the electric field. Thus, the power of the optical signal is not critical. The conversion is transparent and its efficiency is almost unity. Continued advances in electro-optic materials and photonic devices should increase the attractiveness of this approach. And those of ordinary skill in the art will appreciate the applicability of the present teachings thereto.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A frequency shifting device comprising:
   first means for providing a layer of optically refractive material having a moving refractive boundary responsive to an application of a traveling wave electrical signal and
   second means for providing an electrical signal to said first means effective to effect a predetermined frequency shift of an optical signal passing therethrough.

2. The invention of claim 1 wherein said device includes an active polymer layer and a first optically conductive cladding layer above.

3. The invention of claim 2 wherein said device further includes a microstrip line disposed over said first cladding layer.

4. The invention of claim 3 further including an optically conductive second cladding disposed beneath said active polymer layer.

5. The invention of claim 4 further including a ground plane beneath the said second cladding layer.

6. The invention of claim 5 further including a quartz or silicon substrate disposed beneath said ground plane.

7. A frequency shifting device comprising:
   a substrate;
   a ground plane disposed over said substrate;
   an optically conductive second cladding layer disposed over said ground plane;
   an active polymer disposed over said second cladding layer;
   an optically conductive first cladding layer disposed over said active polymer,
   a microstrip line disposed over said first cladding layer.

8. A continuous wave frequency converter comprising:
   first and second frequency shifting devices disposed in first and second optical paths respectively, each of said devices having a layer of optically refractive material with a moving boundary responsive to the application of an electrical signal and
   means for providing an electrical signal to said first and second devices.

9. A method for continuous wave frequency shifting of an optical signal comprising the steps of:
   providing layers of optically refractive material having a moving refractive boundary responsive to an application of a traveling wave sinusoidal electrical signal and
   providing electrical signals to said layers to effect a predetermined frequency shift of an optical signal passing therethrough.

* * * * *